United States Patent Office 3,439,017
Patented Apr. 15, 1969

3,439,017
COMPOUNDS CONTAINING NITROGEN AND
FLUORINE AND A METHOD FOR THEIR
PREPARATION
Travis E. Stevens, Huntsville, Ala., assignor to Rohm &
Haas Company, Philadelphia, Pa., a corporation of
Delaware
No Drawing. Filed May 5, 1964, Ser. No. 365,569
Int. Cl. C07c 85/00, 87/28, 87/02
U.S. Cl. 260—465.5                    14 Claims This invention deals with specific nitrogen- and fluorine-containing compounds as new compositions of matter. It further deals with a method for the preparation of these nitrogen- and fluorine-containing compounds.

The compounds of the present invention may be represented by the formula

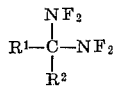

wherein $R^1$ represents hydrocarbon groups containing up to 18 carbon atoms, including alkyl, phenyl, alkylphenyl, naphthyl, alkylnaphthyl, benzylnaphthyl, alkylbenzyl, phenylalkyl and halophenyl. Preferred embodiments include alkyl, especially those of 1 to 4 carbon atoms, phenyl and halophenyl. The halophenyl group may contain chlorine, bromine or fluorine and there may be more than one of these within any embodiment such as di- or trihalo. The halogen may be defined as having an atomic weight of about 19 to 80. The alkyl embodiment may also have a nitrile substituent.

$R^2$ represents a halogen having an atomic weight of about 19 to 80, namely chlorine, bromine or fluorine.

Typical embodiments of $R^1$ include methyl, ethyl, propyl, butyl, octyl, decyl, dodecyl, octadecyl, phenyl, tolyl, xylyl, butylphenyl, octylphenyl, nonylphenyl, naphthyl, ethylnaphthyl, butylnaphthyl, benzyl, ethylbenzyl, butylbenzyl, octylbenzyl, nonylbenzyl, phenylethyl, phenylpropyl, phenylbutyl, chlorophenyl, bromophenyl, fluorophenyl, dichlorophenyl, and trichlorophenyl.

The compounds of the present invention are prepared by reacting a compound having the formula

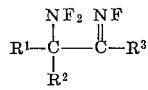

in the presence of difluoroamine and a strong protonic or Lewis acid. The symbol $R^3$ may represent the same embodiments as $R^1$, but it is preferred to employ alkyl of 1 to 4 carbon atoms or phenyl because of cost and availability of the reactants. Also, as far as process is concerned, $R^2$ may additionally represent alkyl of one to four carbon atoms, such as methyl, ethyl or butyl.

In addition to the compounds defined hereinabove, there is also produced an $R^3CN$ as a by-product.

The acidic agent employed should be a fluoride acceptor and be at least as strong as sulfuric acid. Typical embodiments include sulfuric acid, fuming sulfuric acid, fluorosulfonic acid, hydrofluoric acid, boron trifluoride, and antimony pentafluoride. Preferred are sulfuric acid, fluorosulfonic acid and boron trifluoride.

The reaction is conducted at a temperature range of about −50° to 30° C., preferably −10° to 30° C. It is preferred to use the stronger acids defined above so that the reaction progresses at a lower and, therefore safer, temperature. The upper temperature limit is primarily one of safety.

It is preferred to conduct the present reaction by introducing the acidic agent, the fluoroimine and the difluoramine at a temperature well below the reaction range, such as −110° to −100° C. and then permitting the temperature to rise gradually. It is often beneficial to stir the mix as the temperature is gradually rising. The reaction does not begin at any substantial rate until the system is substantially liquid. This, of course, will vary somewhat with the particular acidic agent and fluorimine employed, but will be substantially within the temperature bounds set hereinbefore.

The reaction is preferably conducted in a closed system in order to conserve reactants and maximize yields. The reaction is then conducted at whatever autogeneous pressure develops.

A solvent may be employed, if desired, but one is not necessary. If one is used, it is preferred to use an inert volatile solvent, preferably chlorinated, such as methylene chloride, chloroform, carbon tetrafluoride, chlorobenzene, and the like.

At the conclusion of the reaction, the desired product is isolated by distillation techniques or by chromatography on silica gel. The products that are solid may be recrystallized from hexane, benzene or the like according to conventional techniques. The compounds of this invention are useful as propellant additives for increasing the specific impulse of the propellant. They thereby provide high energy components for rocket propellants. They may be used as plasticizers for compositions containing ammonium chlorate, aluminum and rubbery binders, thereby increasing specific impulse.

The compounds and method of this invention may be more fully understood from the following examples which are offered by way of illustration and not by way of limitation:

EXAMPLE I

Preparation of 1-chloro-1,1-bis(difluoramino)ethane

Fluorosulfonic acid, 6 ml., was frozen and 1.04 grams (6 moles) of 2-chloro-2-difluoramino-3-fluoriminobutane was added to the solid acid. The mixture was degassed in vacuo at −115° and then 220 ml. (STP) of difluoramine was condensed into the 300 ml. reaction bulb. The cooling bath was removed, and the reaction mixture was allowed to come to ambient temperature. After the acid solution had been stirred for 90 minutes, the mixture was pumped in vacuo through −80°, −96°, and −127° baths. 1-chloro-1,1-bis(difluoramino)ethane, 0.54 gram, was retained in the −80° trap. $F^{19}$ n.m.r. (TFA standard, 40 mc.), single peak at −4,525 cps.

Analysis calculated for $C_2H_3N_2F_4Cl$: C, 14.42; H, 1.81; N, 16.83; F, 45.6. Found: C, 14.12; H, 2.01; N, 16.69; F, 45.4.

EXAMPLE II

Method A

Preparation of α,α-bis(difluoramino)-α-chlorotoluene

A mixture of 4 ml. of 100% sulfuric acid and 4 ml. of methylene chloride was cooled to −115° and 1.42 grams (6 mmoles) of 1-phenyl-1-chloro-1-difluoramino-2-fluoriminopropane was added to the cold mixture. The mixture was degassed and then 150 ml. (STP) of difluoramine was condensed into the U-tube. The cooling bath was removed and the mixture was allowed to warm until it could be stirred magnetically; at this point an icebath was placed around the U-tube. After stirring for thirty-five minutes, the mixture was distilled in vacuo through −25°, −80° and −115° traps. The −25° trap retained α,α - bis(difluoramino) - α - chlorotoluene, 0.86 gram.

Analysis calculated for $C_7H_5ClN_2F_4$: C, 36.78; H, 220; N, 12.26; F, 33.3; Cl, 15.5. Found C, 37.38; H, 3.10; N, 13.07; F, 35.8; Cl, 16.6. $F^{19}$ n.m.r.: Single peak at—37.1φ.

Method B

A mixture of 0.72 gram (3 mmoles) of the 1-phenyl-1-chloro-1-difluoramino-2-fluoriminopropane, 100 cc. (STP) of difluoramine, 70 cc. (STP) of boron trifluoride and 2 ml. of methylene chloride was stirred for two hours at ambient temperature in a 25 ml. Fischer-Porter pressure tube. The tube was opened and the volatile contents were removed in vacuo. The residue in the tube was partitioned between water and methylene chloride. Concentration of the methylene chloride solution followed by distillation in vacuo through −25° and −80° traps gave, in the −25° trap, α-chloro-α,α-bis(difluoramino)toluene, 0.4 gram. The infrared and n.m.r. spectra of the sample were identical with those of the sample produced in sulfuric acid.

EXAMPLE III

Preparation of α,α-bis(difluoramino)-α-bromotoluene

A mixture of 4 ml. of 100% $H_2SO_4$, 4 ml. of methylene chloride, 1.68 grams (6 mmoles) of 1-phenyl-1-bromo-1-difluoramino-2-fluoriminopropane and 230 ml. (STP) of difluoramine was allowed to interact in the fashion described above. The reaction mixture was stirred 30 minutes at ice-bath temperature, then the excess difluoramine was removed in vacuo. The residual solution was poured over ice and the organic products were taken up in methylene chloride. The residue remaining (1.3 gram) after evaporation of the methylene chloride was distilled in vacuo to give α,α-bis(difluoramino)-α-bromotoluene, 0.64 gram. The residue from the distillation was starting material (n.m.r.).

Analysis calculated for $C_7H_5BrN_2F_4$: C, 30.79; H, 1.85; N, 10.26; F, 29.3; Br, 27.8. Found: C, 31.41; H, 2.18; N, 11.76; F, 28.1; Br, 26.9. $F^{19}$ n.m.r.: Single peak at $-44.0\phi$.

EXAMPLE IV

Preparation of α,α-bis(difluoramino)-α-chloro-p-bromotoluene

A mixture of 4 ml. of 100% sulfuric acid, 4 ml. of methylene chloride, 205 ml. (STP) of difluoramine and 1.86 grams (6 mmoles) of 1-p-bromophenyl)-1-chloro-1-difluoramino-2-fluoriminopropane were allowed to interact in the usual manner. After one hour at ice-bath temperature, the excess difluoramine was removed and the residue was poured over crushed ice. The organic products were isolated by extraction with methylene chloride and then were chromatographed on silica gel. The products from another run of the same size were added to the material to be chromatographed. Elution of the column with pentane-methylene chloride (15:1) gave α,α-bis(difluoramino)-α-chloro-p-bromotoluene, 1.82 grams, as a colorless liquid.

Analysis calculated for $C_7H_4BrClN_2F_4$: C, 27.34; H, 1.31; N, 9.11; F, 24.7. Found: C, 28.07; H, 1.61; N, 9.77; F, 25.1. $F^{19}$ n.m.r.: Single peak at $-37.5\phi$.

Continued elution of the column with pentane containing increasing amounts of methylene chloride gave 1.16 grams of recovered starting material.

EXAMPLE V

Preparation of 2,2-bis(difluoramino)propane

Four ml. of 100% sulfuric acid was frozen in a −80° C. bath and 0.62 gram (4 mmoles) of 2-methyl-2-difluoramino-3-fluoriminobutane was added to the acid. The mixture was degassed in vacuo and 310 cc. (STP) of difluoramine was condensed into the reactor by means of a −128° C. bath. The cooling bath was removed and the mixture was allowed to warm to 0°. The reaction mixture was stirred at ice-bath temperature for one hour, and the contents of the reactor were then distilled in vacuo through −80° and −128° baths. The −128° bath contained 247 cc. (STP) of recovered $HNF_2$; the −80° trap contained 2,2 - bis(difluoramino)propane, identified by infrared and n.m.r. spectra.

EXAMPLE VI

Preparation of 1-phenyl-1,1-bis(difluoramino)ethane

A mixture of 0.65 gram (3 mmoles) of 2-phenyl-2-difluoramino-3-fluoriminobutane, 100 cc. (STP) of difluoramine, 75 cc. (STP) of boron trifluoride and 2 ml. of methylene chloride in a Fischer-Porter pressure tube was stirred for two hours at ambient temperature. The volatile contents of the reactor were removed in vacuo, while the organic products were extracted into methylene chloride. Chromatography of the organic residue on silica gel gave 1-phenyl-1,1-bis(difluoramino)ethane identified by n.m.r. spectra.

$F^{19}$ n.m.r.: Single peak at $-30.0\phi[C-(NF_2)_2]$.

Proton n.m.r.: $CH_3$—at 2.09 p.p.m. and aromatic protons at 7.52 p.p.m.

EXAMPLE VII

Preparation of 1-chloro-1,1-bis(difluoramino)-5-cyanopentane

Fluorosulfonic acid, 10 ml., was frozen and 2.12 grams (10 mmoles) of the 2-chloro-2-difluoramino-1-fluorimino cyclohexane was added to the frozen acid. The mixture was degassed, and difluoramine, 365 cc. (STP) was condensed into the reaction flask. The mixture was allowed to warm to ambient temperature and was stirred for 45 minutes. After the volatiles had been pumped off in vacuo the acid residue was poured on ice and the organic products were isolated by extraction with methylene chloride. The residue was chromatographed on a silica gel column packed in pentane-methylene chloride. Elution of the column with the same solvent gave 1-chloro-1,1-bis(difluoramino)-5-cyanopentane, 0.52 gram, as a liquid. $F^{19}$ n.m.r. (40 mc., TFA standard): quadruplet centered at −4,522 cps.

Analysis calculated for $C_6H_8N_3F_4Cl$: C, 30.85; H, 3.45; N, 17.99; F, 32.5; Cl, 15.2. Found: C, 31.23; H, 3.80; N, 18.53; F, 32.8; Cl, 15.3.

I claim:
1. A composition of matter having the formula

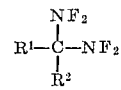

wherein $R^1$ represents groups containing up to 18 carbon atoms from the class consisting of alkyl, phenyl, alkylphenyl, naphthyl, alkylnaphthyl, benzylnaphthyl, alkylbenzyl, phenylalkyl and halophenyl, and $R^2$ is a halogen having an atomic weight of about 19 to 80.

2. A composition of claim 1 wherein $R^1$ is alkyl of 1 to 4 carbon atoms.
3. A composition of claim 1 wherein $R^1$ is phenyl.
4. A composition of claim 1 wherein $R^1$ represents halophenyl in which the halogen has an atomic weight of about 19 to 80.
5. The composition, 1-chloro - 1,1 - bis(difluoramino)-ethane.
6. The composition, α,α-bis(difluoramino) - α - chlorotoluene.
7. The composition, α,α-bis(difluoramino) - α - bromotoluene.
8. The composition, α,α-bis(difluoramino) - α - chloro-p-bromotoluene.
9. The composition, 1-chloro-1,1-bis(difluoramino)-5-cyanopentane.
10. A method for the preparation of the compound having the formula

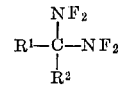

which comprises reacting a compound having the formula

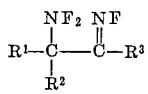

in the presence of difluoramine and a strong acid wherein $R^1$ and $R^3$ represent groups containing up to 18 carbon atoms from the class consisting of alkyl, phenyl, alkylphenyl, naphthyl, alkylnaphthyl, benzylnaphthyl, alkylbenzyl, phenylalkyl and halophenyl, and $R^2$ is a member from the group consisting of chlorine, bromine, fluorine and alkyl of one to four carbon atoms.

11. A process according to claim 10 wherein the reaction is conducted in the range of about −50° to 30° C.

12. A process according to claim 10 wherein the reaction is conducted in the range of −10° to 30° C., in which the strong acid is sulfuric acid.

13. A process according to claim 10 wherein the reaction is conducted in the range of −10° to 30° C., in which the strong acid is boron trifluoride.

14. A method according to claim 10 which is conducted in the range of −50° to 30° C. in the presence of an inert volatile solvent and under conditions of autogeneous pressure.

References Cited
UNITED STATES PATENTS

| | | | |
|---|---|---|---|
| 3,337,605 | 8/1967 | Sausen | 260—465.5 |
| 3,342,867 | 9/1967 | Freeman et al. | 260—583 |
| 3,347,898 | 10/1967 | Peterson | 260—465.5 |

LELAND A. SEBASTIAN, *Primary Examiner.*

U.S. Cl. X.R.

260—570.5, 583; 149—19, 20, 44, 75